United States Patent Office 3,429,979
Patented Feb. 25, 1969

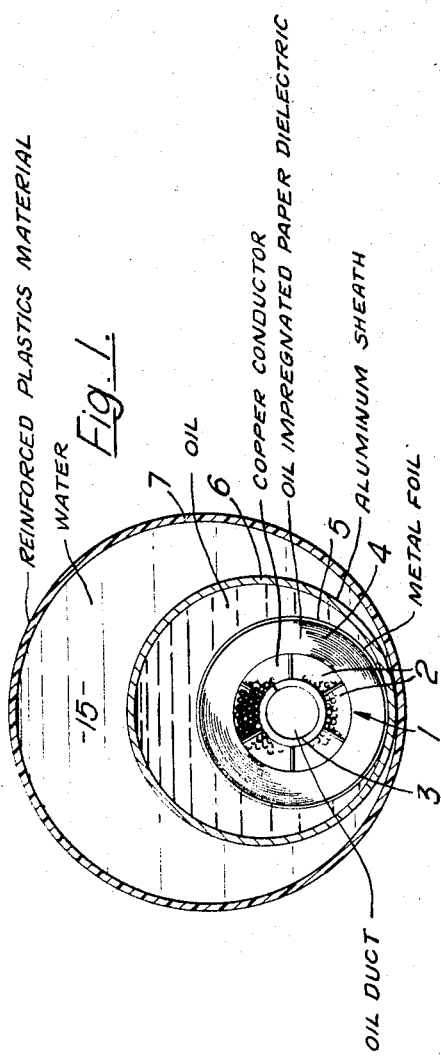
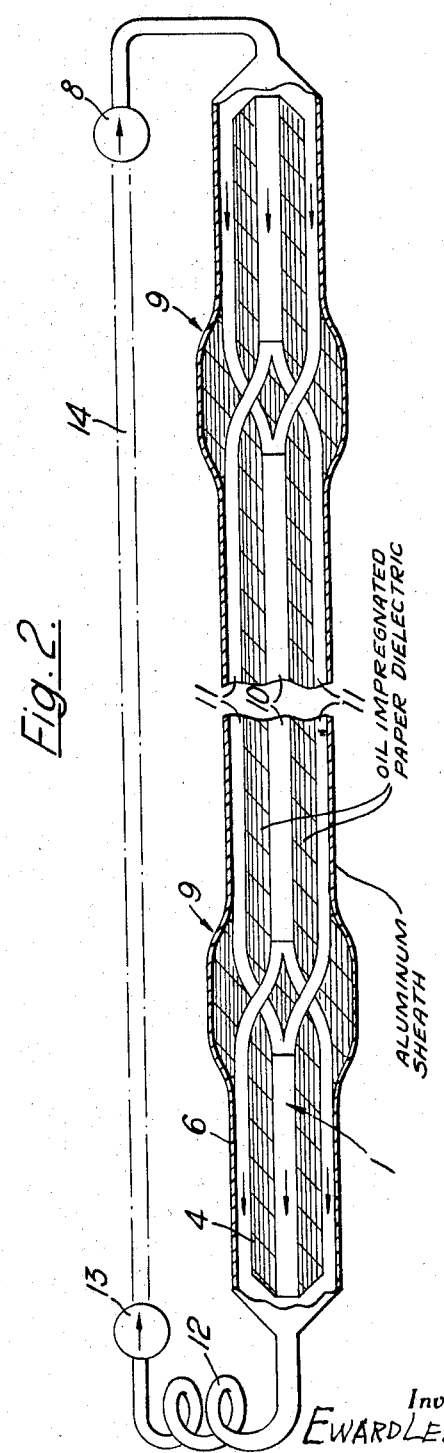

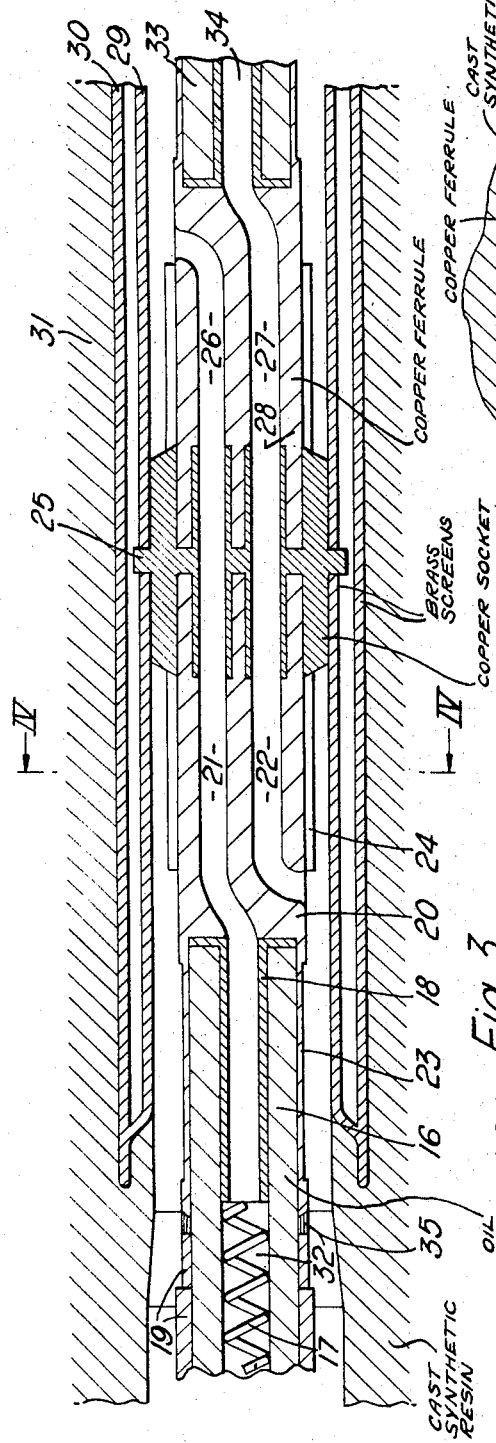
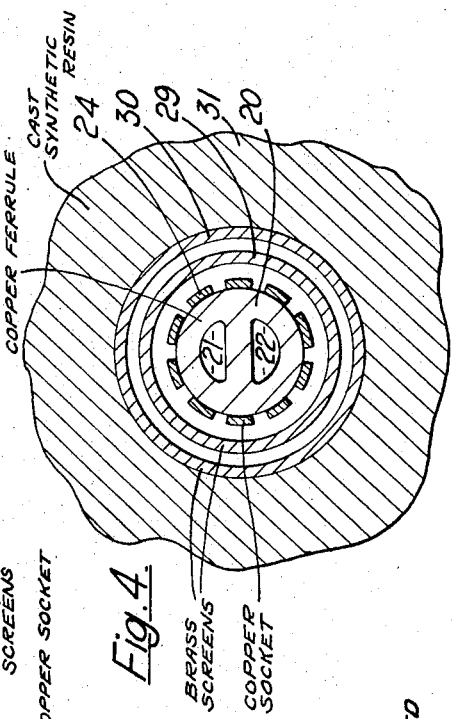
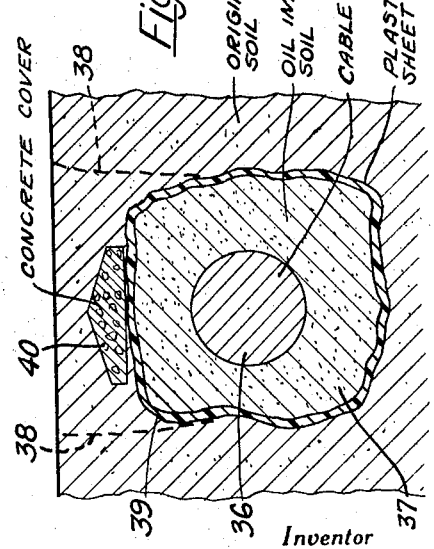

3,429,979
INSULATED ELECTRIC POWER CABLES
Edward Leslie Davey, Bexhill-on-Sea, England, assignor to British Insulated Callender's Cables Limited, London, England
Filed May 2, 1967, Ser. No. 635,618
Claims priority, application Great Britain, May 2, 1966, 19,217/66
U.S. Cl. 174—15     19 Claims
Int. Cl. H01b 7/34, 9/06

ABSTRACT OF THE DISCLOSURE

A high voltage high power cable installation cooled by a forced flow of cooling liquid, which may be the dielectric impregnating oil of an oil-filled cable. One stream of the cooling liquid flows through a hollow conductor of the cable and another stream flows in the same direction along the cable through a passage between the screened cable core and sheath, the two streams being transposed at intervals, usually within the joint enclosures.

---

This invention relates to insulated electric cables for the transmission of very large amounts of power at very high voltages, hereinafter referred to as "high voltage, high power cables." Such cables, whether for transmission of alternating or direct current, are usually single core cables but the term "cable" is used herein to include both single and multi-core cables. The term also includes an insulated conductor forming part of a bus-bar system for high voltage, high power alternating or direct current transmission. The invention also relates to installations of high voltage high power cables.

The amount of power to be transmitted in a single high voltage, high power cable circuit, that is by a single three-core cable or three single-core cables, constituting an A.C. circuit, or by two single core cables constituting a D.C. circuit, is upwards of 1000 megawatts and may be over 2000 megawatts. Even at circuit transmission voltages of 400 kv. A.C. or 500 kv. D.C. the cable losses in such circuits may be about 200 kw. per cable mile in the case of A.C. cable operating at a conductor temperature of 85° C. and about 80% of that value in the case of each cable of an equivalent D.C. circuit. In the case of an A.C. cable, almost 80% of this loss is the $I^2R$ loss generated in the conductor. In a D.C. cable the proportion is even higher.

The only cable insulation in commercial use at the present time in high voltage, high power cables is impregnated paper, which limits the temperature at which the cable can safely be continuously operated to 85° C. at the conductor. In such 500 kv. D.C. cables the thickness of the dielectric wall, even if one operates at a stress as high as 200 kv./cm., would be between three and four cms. and so constitute a high thermal resistance to the transmission of heat from the conductor radially outwards to the cable sheath and to ground or some other ambient medium. However, the problem of removing heat generated in the conductor will also arise in the case of high voltage, high power cables which will have a laminated or monolithic dielectric of plastics material.

With the object of facilitating the abstraction of heat from the conductor of a high voltage, high power cable proposals have been made to circulate cooling liquid through the bore of the conductor and through some external heat exchanger for abstracting heat from the conductor heated cooling liquid before it is returned to the conductor. The proposed arrangements however are either unduly expensive or have certain technical disadvantages. Accordingly it is an object of the present invention to provide an improved cooling arrangement for a high voltage, high power cable.

In accordance with the invention a high voltage, high power cable is cooled by a forced flow of cooling liquid through the (or each) hollow conductor of the cable and through one or more passages between the screened core of the cable and its sheath, the flow through the former and the flow through the latter being in the same direction but with a periodic transposition of the two streams of cooling liquid at intervals along the cable.

The transposition of the streams from the interior of the cable core to the exterior may be effected at cable joints. Where the cooling liquid is the same as that used to impregnate the dielectric or is compatible with the dielectric these joints may be of the oil-feed type but modified to provide a feed channel from the hollow conductor of one jointed length to the channel or channels between the core and sheath of the next jointed cable length and a feed channel from the channel or channels between the core and sheath of the first jointed length to the hollow conductor of the said next jointed cable length. Such transposition of streams may be effected at every cable joint or at less frequent intervals.

The improved system of cooling has the advantage that by making use of the lower thermal resistance of the outer parts of the cable structure the rate of flow of coolant through the cable can be reduced and the rise in temperature of the coolant flowing through the conductor can be limited without the need to pass it through one or more heat exchangers outside the cable, at intervals along the cable route, and this without material detriment to the cable joints since the heating effect of hot coolant flowing from the conductor of the cable length on one side of a joint will be compensated by the cooling effect of cooled coolant flowing from the outer part of that cable length into the conductor of the neighbouring cable length on the outer side of the joint.

It is not essential but preferable to arrange that the hydraulic resistance to flow of the passage or group of passages for coolant outside the cable core is approximately equal to that of the duct or ducts in the conductor or conductors. In this way hydraulic pressure differences are avoided between the inner and outer streams of coolant both in the cable and in joints, which facilitates joint construction.

Whether the cable system be a single or double circuit three-phase cable system or a single circuit D.C. cable system, coolant liquid may be admitted to each cable at one end of the system and discharged at the other to perform some useful function e.g. space heating. It will generally be preferable however to provide for its re-use as cable coolant, in which case it may be forced through one cable of a cable system and returned through another cable of the system or through a special return pipe. For example, in the case of a twin circuit three phase cable system employing single core cables, coolant may be circulated through all six cables in succession. In the case of a single circuit D.C. system employing one negative and one positive single core cable, coolant may pass along one cable in one direction and return along the other cable. In the twin circuit three-phase system a return pipe for the oil, that can be brought into use when one circuit is out of commission, is preferably provided. Similarly a third cable that can act as a "return pipe" when one cable is out of commission is preferably laid in the D.C. system.

The system as so far described may be used satisfactorily in situations where the thermal conductivity of the soil or other ambient matter is good and likely to remain so indefinitely—for example where the cable is laid below the level of the prevailing water-table or on the sea bed. In cases where the thermal resistivity of the soil or other ambient medium is initially high or is likely to become high due to moisture being driven away from the immediate neighbourhood of the cable by heat emanating from the cable, it is preferred to place the cable within a pipe or duct line through which a secondary cooling fluid may be forced, such as water or air. In this case the secondary cooling medium on reaching the remote end of the cable system may be discharged or put to other use or it may be passed through a heat exchanger to cool it and then passed into a pipe or duct enclosing a second cable of the system after which (in the case of a single circuit three phase system employing single core cables) it may be again cooled and then passed through the pipe or duct enclosing the third cable of the system and finally returning through a water return pipe, preferably after having been cooled again, for recirculation through the system as before. In the case of a double circuit three phase A.C. cable system or a twin cable D.C. system no return water pipe would be necessary. Instead of placing each single core cable of an A.C. or D.C. system in a separate pipe through which a secondary cooling medium may be forced, the three single core cables of an A.C. system or both cables of a D.C. system may be placed in a single pipe of appropriate diameter, providing a separate pipe of smaller diameter for the return of the secondary cooling medium. In the case of a double circuit system no separate return pipe would be necessary. A cheaper but less effective arrangement that may be adopted in situations where the thermal resistivity of the soil is likely to become high in the vicinity of the cable due to moisture being driven away by heat emitted from the cable, is to embed the cables and any pipe that may be required for the return of the primary coolant oi oil impregnated soil contained within a plastics envelope. Water cooling pipes may also be embedded in the oil impregnated soil within the envelope.

In certain cases it may be desirable to ensure that a cable system constructed in accordance with the improved invention shall be capable of transmitting a heavy load, for example 50% of its maximum rating, for a prolonged period in the event of a breakdown of the coolant circulation. This can readily be done in the case of a system comprising two or more single core cables by appropriately increasing the spacing at which the cables are laid as compared with the spacing at which they would have been laid on the assumption that they would be loaded only when cooled in accordance with the invention. When that is done, the same cable will whilst the forced cooling system is in operation, carry a heavier load owing to the more effective heat sink for the cooling liquid resulting from the wider spacing. Alternatively the pumping pressure or the sizes of the conductor duct and the duct between the cable code and sheath may be reduced.

The following description given by way of example with reference to the accompanying diagrammatic drawings of a 400 kv. oil-filled A.C. cable system having a maximum current rating of 3200 amps will enable the advantages of the invention to be more readily appreciated. In the drawings:

FIGURE 1 represents a cross-section of a cable,
FIGURE 2 is a diagram of the system,
FIGURE 3 is a cross-sectional elevation of part of a joint used in the system,
FIGURE 4 is a cross-section on line IV—IV in FIGURE 3 and
FIGURE 5 is a cross-sectional elevation of a buried cable.

Each of the three single core cables constituting the system has a conductor 1 of 3 sq. inch cross-sectional area built up of six segmental strands 2 laid up around an open-turn metal helix 3 of 1.5" external diameter. On this conductor is an externally screened dielectric wall 4 of oil impregnated paper of which the external diameter is 4.2". The dielectric screen 5 is of a material that is not eroded by circulating oil, e.g. metallised paper or thin metal foil. Surrounding this cable core is an aluminium sheath 6 of a diameter about 1" greater than the screened core such that the resistance to flow of oil along the clearance between the core and its sheath approximates to the resistance to flow of oil along the centrol duct (allowing for the higher temperature of the oil in the central duct). This cable is installed in an 8" internal diameter pipe 7 of reinforced plastics material and capable of withstanding an internal water pressure of 100 lbs/sq. inch gauge at 15° C. and a pressure of a few pounds/sq. inch gauge at 60° C. That is to say it will withstand cold water being pumped into one end at a pressure of 100 lbs./sq. inch gauge and will withstand the water flowing out of it at little or no pressure at the other end at a temperature of 60° C.

The cables are oil-filled and a pumping pressure of 100 lbs./sq. inch gauge is applied by a pump 8 (FIGURE 2) to the central duct and to the outer duct at one of the cable terminations of one cable of the system. The oil is preferably of lower viscosity than that used normally in oil filled cables, it may for example consist wholly or partly of dodecyl or hexyl benzene. As shown diagrammatically in FIGURE 2 at each cable joint 9 in the cable the oil from the central duct 10 and the outer duct 11 is transferred to the outer and central ducts 11 and 10 respectively, of the next length. At the remote end of the system the oil passes through a heat exchanger 12 and another pump 13 a pump which delivers it to the central and outer ducts at the adjoining termination of a second cable of the system (not shown) and passes along the cable, being transferred from one channel to the other at each cable joint. On reaching the end of this cable it passes through a pump which delivers it to the central and outer ducts at the adjoining termination of the third cable of the system (not shown.) On reaching the remote end of this third cable it passes to a fourth pump which pumps it back through an oil return pipe to the first mentioned termination for re-circulation. For simplicity the second and third cables (which are identical with the first cable) and the return pipe are all represented in FIGURE 2 by the dotted lines 14.

Cold water is pumped into the clearance 15 (FIGURE 1) between one of the three cables and the pipe 7 in which it is laid at one end of the pipe and on reaching the other end is cooled and pumped through the pipe housing a second cable. On reaching the end of the second pipe it is again cooled and pumped through the pipe housing the third cable of the system. On reaching the end of that pipe it is again cooled and pumped through a return water pipe to the inlet end of the first pipe for recirculation.

The cable joints 9 at which transposition of the oil from the sheath duct 11 to the conductor 10 takes place can be oil-filled cable oil-feed stop-joints, modified by the provision of a jointing ferrule having two parallel bores, one connecting the duct of the cable length at the first side of the joint barrier to the space surrounding the ferrule on the second side of the barrier and the other connecting the conductor duct of the cable length on the second side of barrier to the space surrounding the ferrule on the first side of the barrier.

An oil-filled cable stop-joint of a kind which can readily be modified in this way is the joint that is described and illustrated in the complete specification of U.K. Patent No. 955,202, and FIGURES 3 and 4 of the present application indicate the necessary modification to the joint ferrules (of which there are two in this type of joint, one situated on each side of the barrier).

Referring to FIGURES 3 and 4, the hollow conductor 16 on the first side of the barrier, which is built around a steel helix 17, is fitted with an end mandrel 18, the dielectric 19 having been cut back in steps in the normal way. A ferrule 20 formed with two parallel bores 21 and 22 is compression jointed at 23 on to the conductor 16 and is fitted into a socket formed by flexible fingers 24 projecting from a metal barrier plate 25. The barrier plate 25 is formed with two apertures each of which mates both with one of the ducts 21 and 22 and with one of two similar ducts 26 and 27 formed in a ferrule 28 located on the second side of the barrier. As in the joint structure described in the above mentioned U.K. patent specification, the barrier 25 is in engagement with inner and outer cylindrical metal screens 29 and 30 embedded in a body 31 of synthetic resin.

It will be seen that oil can flow freely from the central duct 32 of the first cable through the ducts 21 and 26 of the ferrules 20 and 28 into the space around the ferrule 28 and from that space through oil passages provided in the joint insulation the sheath and dielectric of the second cable the conductor 33 which is shown in FIGURE 3. Similarly oil can flow freely from the central duct 34 of the second cable into the space surrounding the ferrule 20 and into the sheath of the first cable. Leakage of oil from the conductor 16 between the ferrule 20 and the dielectric 19 is prevented by insulating tape 35.

Similar single piece ferrules, or ferrules made in two or more parts, can be used for modifying other oil-feed stop-joints for use in accordance with the invention, provided that such joints allow for a sufficiently free flow of the oil from the space between each cable sheath and the core within it to the spaces within the joint structure around the ferrule of ferrules on each side of the joint barrier but prevent flow of oil from the sheath space into the conductor duct of the same cable.

The cable 36 is embedded in a trench shown by the dotted lines 38. The trench is then lined with a thin flexible plastic sheet material 39. Soil impregnated with oil is used as back-fill around the cable 36, the sides of the plastic sheet being upon the back-fill to form a plastics envelope. A concrete cable cover 40 is placed over the cable and the trench filled with unimpregnated soil.

As will be appreciated, the temperature of the cooling water in each pipe will gradually increase as it passes along the pipe from inlet to outlet end. Consequently the heat abstracted/unit length of pipe from the cable will gradually diminish along the cable from the water inlet and to the water outlet end of the pipe, and the temperature of the oil in the central duct, measured at the outlet end of the duct, will increase step by step along the cable from one joint to the next. Accordingly the maximum permissible length of the system will be determined by the point at which the oil in the central duct attains the maximum temperature which the dielectric can safely withstand without deteriorating. At the present time this is generally reckoned to be 85° C., i.e. a rise of say 70° C. above the initial temperature of 15° C.

In the example described if the cables are laid in flat formation at 12″ centres 36″ below the surface, the system may have a route length of between 8000 and 9000 yards but if laid at 20″ centres so as to be capable of transmitting 50% of its rated loading in the event of a failure in the forced cooling system, the system may have a route length of about 11,000 yards.

Although in the example described the cable core lies eccentrically in a loose fitting sheath a sheath formed with internal longitudinal ribs which support the cable core concentrically within the sheath can be used, the spaces between the ribs then providing a plurality of ducts through which the cooling fluid flows.

Transposition of the inner and outer streams of coolant flowing within the cable may well result in the cable dielectric at the trailing end of a jointed cable length (and by trailing end is meant the rear end considered in regard to the direction of flow of coolant) adjacent a transposition joint having an inverse temperature gradient. This is of no great consequence in the case of alternating current cables but may be dangerous in the case of D.C. cables that are not designed to cope with such a phenomenon.

In a cable transmitting only direct current the electrical stress distribution in the dielectric is governed by distribution of resistance of the dielectric wall. With a dielectric of uniform resistivity, this is a maximum at the conductor and diminishes exponentially as the radius of the dielectric increases. However the resistivity of impregnated paper insulation and indeed of cable dielectrics in general decreases with increase in temperature. Accordingly as a D.C. cable takes up its load and its conductor heats up, the stress in the dielectric in the region of the conductor diminishes and that in the outer region increases. Without conductor cooling this redistribution may proceed to such an extent that the stress in the dielectric at the dielectric/dielectric screen interface exceeds the stress in the dielectric at the conductor/screen dielectric interface. On the other hand, the existence of an inverse temperature gradient at the trailing end of a jointed length adjacent a transposition joint will result in the resistivity of the outer part of the dielectric wall being lower at that end than the average throughout the transposition length and in the resistivity of the inner part of the dielectric wall being higher than the average throughout that length. In consequence the stress in the inner part of the dielectric wall at such trailing end will be higher than elsewhere along the length and the stress in the outer part will be reduced. To avoid the need to modify the design of the whole dielectric to cope with such a local increase in stress, the hollow conductor at the trailing end of a transposition length may be provided with a lining of thermal isulation. This will result in an increase in conductor temperature in this region, thus lowering the electrical resistivity of the inner part of the dielectric wall and so reducing the electrical stress thereon at the expense of an increase in stress in the outer part of the dielectric in the said region.

The nature and thickness of such lining will generally be so chosen that under full load conditions of the cable, the temperature difference across the dielectric wall at the trailing end of a transposition length will be reduced to such an extent that the maximum stress in the dielectric wall at such end will at least be no greater than the maximum stress in the dielectric wall at any other point in the same transposition section. As the distance from the transposition point increases, the coolant in the duct or ducts between the cable core and sheath gradually cools whilst that in the conductor warms. At some point along the length the two will be at the same temperature. Beyond such point the lining of thermal insulation is neither necessary nor desirable. Where the cable conductor is built up around an open-turn metal helix, it is generally convenient to interpose the lining of thermal insulation between that helix and the conductor itself.

Cables operating in accordance with the invention, when laid within a pipe or pipes through which water or other secondary cooling medium is forced, may be designed without regard to gradients encountered along the cable route, providing the pipe or pipes are designed to be capable of withstanding the pressure due to pumping and hydrostatic head to which it will be subjected under operating conditions.

What I claim as my invention is:

1. A method of cooling a high voltage, high power electric cable which comprises forcing parallel streams of cooling liquid to flow in the same direction through at least one hollow conductor of the cable and through at least one passage between the screened core of the cable and its sheath and periodically transposing the two streams of cooling liquid at intervals along the cable.

2. A method as claimed in claim 1 in which each transposition is effected wholly within an enclosure for a joint between lengths of the cable.

3. A method as claimed in claim 1 in which the cable is an oil-filled cable and the cooling liquid is the same liquid as is used to impregnate the cable dielectric.

4. A method as claimed in claim 1 in which said liquid is the primary cooling liquid and heat is extracted from the primary cooling liquid by circulating a secondary cooling fluid along the cable around its sheath.

5. A method as claimed in claim 1 in which the cooling liquid circulates continuously in a closed circuit including said cable and at least one other similar cable laid along the same route.

6. A method as claimed in claim 5 in which the cooling liquid also circulates through at least one heat exchanger for extracting heat therefrom.

7. A method as claimed in claim 5 in which the cooling fluid flows through a plurality of cables laid along the route and through a return pipe laid along the route.

8. In a high voltage, high power, electric cable installation comprising at least one electric power cable having a hollow conductor embedded in insulation over which is applied a conductive layer to form a screened core, the core being surrounded by a sheath leaving at least one passage for liquid between the screened core and the sheath, means for causing a first stream of cooling liquid to flow through said conductor and a second stream of cooling fluid to flow through said passage in the same direction along the cable as the first stream, and means located at interavls along the cable route for transposing the first and second streams.

9. An installation as claimed in claim 8 comprising joints between lengths of the cable, located at intervals along the cable route, each so constructed as to cause transposition of said first and second streams wholly within the joint enclosure as the streams of liquid pass from one to the other of the two cable lengths connected at the joint.

10. An installation as claimed in claim 8 comprising at least two electric power cables laid along the same route, and means interconnecting said cables at at least one end and means located at intervals along each cable for transposing said first and second streams such that both streams flow in the same direction as each other along one cable and from at least one end of said cable into the same end of the other cable and in the same direction as each other along the other cable, said second direction being opposite, with respect to the cable route, as said first direction.

11. An installation or cable as claimed in claim 8 in which at least one cable is laid in a duct through which a secondary cooling fluid passes.

12. An installation as claimed in claim 8 in which at least two cables are laid in the same duct.

13. An installation or cable as claimed in claim 8 in which at least one cable is embedded in oil impregnated soil contained within a plastics envelope.

14. A single circuit D.C. cable installation as claimed in claim 8 comprising one negative and one positive single core cable, in which the cooling liquid passes along one cable in one direction with respect to the cable route and returns along the other cable in the other direction with respect to the cable route.

15. A twin circuit three phase cable installation as claimed in claim 8 comprising six single core cables through which the cooling liquid circulates in succession.

16. An installation as claimed in claim 8 in which the hydraulic resistance to flow of the cooling liquid is approximately the same for each stream of cooling liquid.

17. An installation as claimed in claim 8 comprising stop-joints in which the first and second streams of cooling fluid are transposed, said joints incorporating conductor jointing ferrules having two bores through each of which one stream flows, each bore opening at one end into one of the hollow conductors connected by the ferrule and at the other end into a space around the ferrule on the opposite side of the joint barrier.

18. A D.C. electric cable installation as claimed in claim 8 in which parts of the hollow conductor of the cable in the region where oil enters the conductor are lined with thermal insulation to prevent undue variation in the temperature gradient and hence the stress gradient in the dielectric wall of the cable.

19. A cable installation as claimed in claim 18 in which the nature and thickness of such lining is such that, under full load conditions of the cable, the temperature difference across the dielectric wall at the trailing end of a transposition length is reduced to such an extent that the maximum stress in the dielectric wall at such end is at least no greater than the maximum stress in the dielectric wall at any other point in the same transposition section.

References Cited

UNITED STATES PATENTS

| | | | |
|---|---|---|---|
| 3,363,046 | 1/1968 | Endacott | 174—15 |
| 2,985,708 | 5/1961 | Ross | 174—15 X |
| 3,084,208 | 4/1963 | Palandri et al. | 174—24 |
| 2,161,413 | 6/1939 | Gooding et al. | 174—21 |
| 2,861,119 | 11/1958 | Collonge | 174—24 |

FOREIGN PATENTS

| | | |
|---|---|---|
| 1,389,838 | 1/1965 | Great Britain. |
| 449,855 | 7/1948 | Canada. |
| 617,699 | 2/1949 | Great Britain. |

LEWIS H. MYERS, *Primary Examiner.*

A. T. GRIMLEY, *Assistant Examiner.*

U.S. Cl. X.R.

174—22, 25, 37